United States Patent [19]
Henneuse

[11] Patent Number: 5,493,288
[45] Date of Patent: Feb. 20, 1996

[54] SYSTEM FOR MULTIDIRECTIONAL INFORMATION TRANSMISSION BETWEEN AT LEAST TWO UNITS OF A DRILLING ASSEMBLY

[75] Inventor: Henry Henneuse, Billere, France

[73] Assignee: Elf Aquitaine Production, France

[21] Appl. No.: 302,444

[22] Filed: Sep. 12, 1994

Related U.S. Application Data

[63] Continuation of Ser. No. 977,391, Mar. 1, 1993, abandoned.

[30] Foreign Application Priority Data

Jun. 28, 1991 [FR] France .................................. 91 08099

[51] Int. Cl.⁶ ...................................................... G01V 1/00
[52] U.S. Cl. ........................... 340/854.4; 340/854.9; 340/855.8; 340/853.3; 340/853.6
[58] Field of Search ............................. 340/854.9, 854.4, 340/855.8, 854.6, 853.3, 853.6; 175/40

[56] References Cited

U.S. PATENT DOCUMENTS

| | | | |
|---|---|---|---|
| 3,737,845 | 6/1973 | Maroney et al. | 340/18 P |
| 3,828,313 | 8/1974 | Schull et al. | 340/147 SY |
| 3,959,767 | 5/1976 | Smither et al. | 340/18 P |
| 4,459,760 | 7/1984 | Watson et al. | 33/312 |
| 4,593,559 | 6/1986 | Brown et al. | 73/151 |
| 4,620,189 | 10/1986 | Farque | 340/856 |
| 4,788,545 | 11/1988 | Farque | 340/856 |
| 4,800,385 | 1/1989 | Yamazaki | 340/854 |
| 4,876,539 | 10/1989 | Farque | 340/856 |
| 4,901,070 | 2/1990 | Vandevier | 340/856 |
| 4,968,978 | 11/1990 | Stolarczyk | 340/854 |
| 5,008,664 | 4/1991 | More et al. | 340/854 |
| 5,060,737 | 10/1991 | Mohn | 175/104 |
| 5,160,925 | 11/1992 | Dailey et al. | 340/853.3 |

FOREIGN PATENT DOCUMENTS

| | | | |
|---|---|---|---|
| 1202712 | 4/1986 | Canada | G01V 1/28 |
| 0108903 | 5/1984 | European Pat. Off. | |
| 2115554 | 9/1983 | United Kingdom | |

*Primary Examiner*—J. Woodrow Eldred
*Attorney, Agent, or Firm*—Bacon & Thomas

[57] ABSTRACT

System for transmitting information between at least two units of a drilling assembly by means of an electrical link along the drill string. The system of the invention provides for multidirectional transmission between the units.

13 Claims, 2 Drawing Sheets

5,493,288

SYSTEM FOR MULTIDIRECTIONAL INFORMATION TRANSMISSION BETWEEN AT LEAST TWO UNITS OF A DRILLING ASSEMBLY

This application is a continuation of application Ser. No. 07/977,391 filed Mar. 1, 1993 now abandoned.

TECHNICAL FIELD OF THE INVENTION

The subject of-the present invention is a system for multidirectional information transmission between at least two units of a drilling rig, and more particularly by means of an electrical link situated along the drill string.

BACKGROUND OF THE INVENTION

For many years, the oil companies have equipped the drill strings with various bottom drill bits which supply, in the course of drilling and without interrupting the latter, various measurements suitable for carrying out a deviation or for evaluation of the layers traversed and, more recently, data such as the torque and the weight transmitted to the drill bit as well as an evaluation of the vibratory behaviour of the string and of the drill bit sensed at the bottom.

However, the technological range of some of these drill bits remains limited; in effect, the current techniques for information transmission, in the course of drilling, by sending pulses into the mud or by sending electromagnetic waves allow only a low data throughput from the bottom to the surface, which considerably reduces the development of more sophisticated drill bits.

However, for several years, the oil industry has started to use electrical links arranged from the surface to the bottom of the well, along the drill stem, and intended, among other things, to provide the power supply to a motor situated at the bottom. Such links are described in the following documents: U.S. Pat. Nos. 3,378,811, 3,518,608, 3,696,332, 3,807,502, 3,825,078.

SUMMARY OF THE INVENTION

Thus the subject of the present invention is a system for multidirectional transmission between at least two units of a drilling rig, this transmission taking place between bottom and surface along an electrical link.

In order to do this, the invention proposes a system for information transmission between at least two units of a drilling rig by means of an electrical link situated along the drill string, characterised in that it allows multidirectional transmission between the units.

Other characteristics and advantages of the present invention will appear more clearly on reading the description given below by reference to the attached drawings.

DETAILED DESCRIPTION OF THE INVENTION

Figure 1:
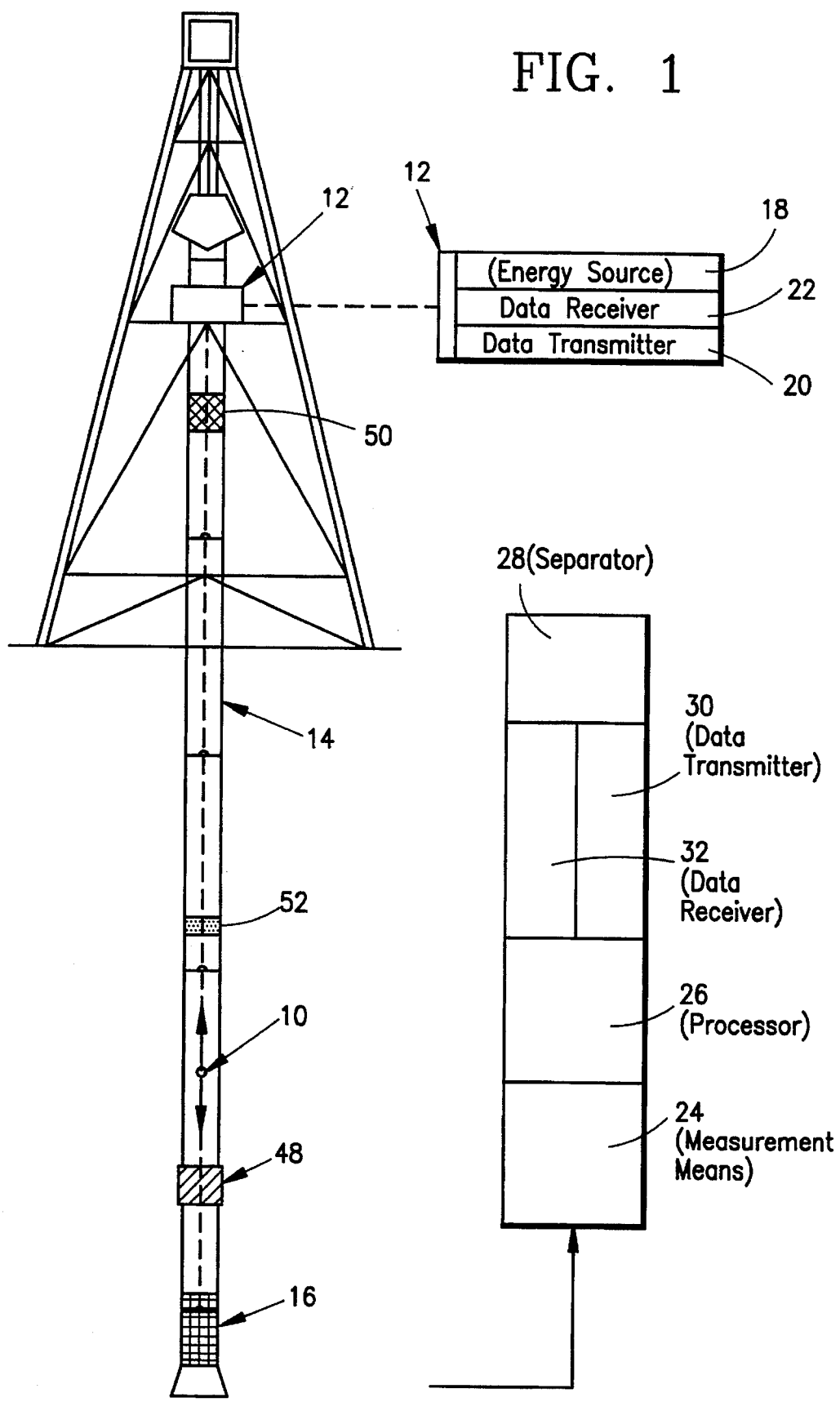
FIG. 1 represents an overall view of the multidirectional transmission system according to the invention.

As represented in FIG. 1, the transmission system comprises an electrical link 10 set up between a rotating collector 12 arranged at the top of the drill string 14 and a drill bit 16 situated at the bottom of the string 14, the rotating collector 12 providing electrical continuity between the moving string, an energy source 18, a surface data transmitter 20 and a receiver for data originating from the bottom 22. The bottom drill bit 16 comprises measurement members 24 such as strain gauges or accelerometers, processing means 26, a separator between energy and information 28, a bottom data transmitter 30 and a surface data receiver 32.

In order to allow multidirectional transmission of the energy and of the information between the bottom and the surface, or any intermediate point, the present system comprises the following characteristics;

the energy is transmitted by means of the electrical link 10 from the source 18 to the separator 28 which allows power to be supplied to the bottom drill bit 16, the information originating from the bottom is supplied by the measurement members 24, processed by the processing means 26 then transmitted by means of the electrical link 10 from the bottom data transmitter 30 to the bottom data receiver situated at the surface 22, the information originating from the surface is transmitted to the bottom by means of the electrical link 10 from the surface data transmitter 20 to the surface data receiver situated on the bottom 32.

Whatever the nature of the electrical link existing between the bottom and the surface, the present transmission system possesses the following capabilities:

it makes it possible to provide global or selective transmission to the surface of measurements originating from the bottom of the well, and to do so whatever the nature thereof, such as the torque, the weight on the drill bit, the voltage or the current drawn by the bottom motor, azimuth of the drill bit etc. Moreover, the user is in a position to receive reception acknowledgements meaning that his orders have been executed by the bottom drill bit or that his own messages are erroneous; finally, the bottom drill bit is capable of transmitting a diagnosis to the user in the event of partial malfunction, it allows the user to implement the operations which seem to him to be necessary, whether remote monitoring or implementation, or also parameter measurement, namely the choice of the measurement channels from which it is desired to gather the data at the surface, and the adjustment of the conditioning stages such as the programmable-gain amplifiers with the aim of improving the ratios between signal and noise, or, finally, remote programming, that is to say remote loading of part or all of the machine codes specific to the processors, central units or signal processors, the triggering of preprogrammed processing, interventions in the multi-task context or remote maintenance.

Hence, such a system allows; monitoring of the drilling rig as well as the correction of transmission errors; interaction between the user and the bottom drill bit, or any intermediate point, in that the user can call, at any moment, for a particular processing or measurement; the optimisation of the transmission channel since a degradation in the said channel does not prevent the exchanges continuing; an improvement in the reliability by switching over redundant members as well as increased simplicity and effectiveness in implementation, given that any adjustment can be carried out in bottom conditions.

Figure 2:
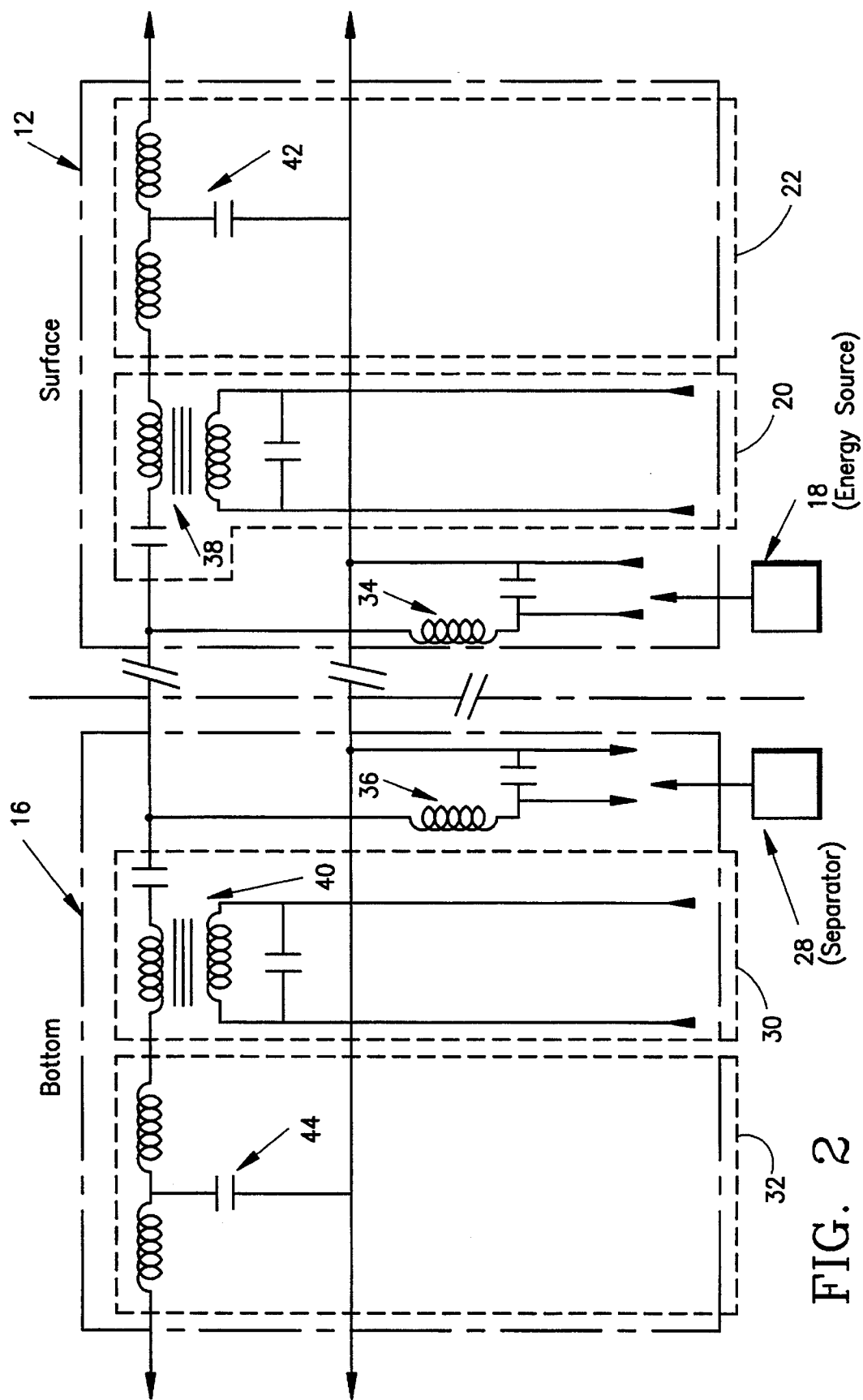
FIG. 2 diagrammatically represents an electronic circuit used in the system of FIG. 1.

As represented in FIG. 2, the energy source 18 at the surface as well as the load 28 are each connected to the electrical link through a rejection filter, respectively 34 and 36; the bottom 22 and surface 32 data receivers are each equipped with a band pass filter, respectively 42 and 44; the surface 20 and bottom 30 data transmitters are coupled to the electrical link by means of a selective coupled circuit comprising an isolating transformer, additionally providing impedance matching, respectively 38 and 40.

The surface data transmitter 20 transmits information in electrical form by means of the transformer 38 and by the use of the electrical link 10 situated in the drill string 14, the said information being transmitted at a frequency Fs known as surface frequency, and being picked up at the site of the receiver 32 which is tuned to the Fs frequency. The bottom data transmitter 30 transmits information at the frequency Fb known as bottom frequency, the said information being picked up at the site of the receiver 22 which is tuned to the bottom frequency Fb. Moreover, the surface data transmitter 20 and receiver 32 are equipped with filters 38 and 44 for rejecting the bottom frequency Fb while the bottom data transmitter 30 and receiver 22 are equipped with filters 42 and 40 for rejecting the surface frequency Fs.

The source 18 transmits the energy by use of the electrical link 10 to the energy-information separator 28, the said energy consisting of a direct or alternating current at a frequency which is, a priori, lower than Fs and Fb. In both cases, the source 18 and the separator 28 are equipped with filters 34 and 36 for rejecting the surface Fs and bottom Fb frequencies.

Hence, each unit is assigned a specific transmission and reception frequency, which has the effect of preventing any interference as far as possible.

It is also possible to allocate a single communications frequency to the whole of the system and assign a specific address to each unit.

It is also possible to generalise this transmission system, by applying it to several points situated anywhere on the drill string, or even on the work site. However, such a system would be much too complex to manage if each unit were allocated a specific transmission and reception frequency; for this reason only a single communications frequency is adopted for the whole of the system, while each unit is assigned a specific address.

In the example illustrated in FIG. 1, the system comprises five subassemblies, namely a rotating collector 12, a bottom drill bit 16, a motor 48, a valve 50 and an apparatus 52 allowing the connection and the disconnection of any drill bit present in the well, each of the said subassemblies being allocated an address.

It is then necessary to equip the system with a surface server whose role is to transmit messages comprising the address of the recipient and possibly to allocate the said recipient a response time during which all the units, including the server, are forbidden to transmit.

The person skilled in the art will have available numerous other possibilities for producing such a transmission system, such as the allocation of an ancillary carrier frequency reserved for measurement. Hence, such a system offers the possibility of remotely controlling any equipment which might come to be introduced into the drill string in order to carry out a particular operation therein. This system may be applied to driving an electrical bottom motor and to tracking its behaviour, to the control of an electric valve, to the control of an apparatus carrying out the positioning or withdrawal of any element present in the string, as well as to interactive exchanges with a bottom measuring drill bit.

I claim:

1. A system for transmitting information between at least two units of a drilling rig during a drilling operation, said system comprising:

a drill string having a drill bit subassembly disposed at one end an electric motor subassembly for providing power to said drill bit subassembly, and at least one other subassembly;

means situated along the drill string for providing electrical energy to said motor and for providing multi-directional communication between one unit which is said drill bit subassembly and at least one other unit which is said at least one other subassembly during the drilling operation, wherein said drill bit subassembly and said at least one other subassembly share a common reception frequency and a common transmission frequency, said reception and transmission frequencies being different from a frequency of power supplied to said power supply means, thereby allowing power transmission and two way communications between said subassemblies and the surface, and wherein said drill bit subassembly and said at least one other subassembly are each allocated a different address to allow separate communications between the surface, said drill bit subassembly, and said at least one other subassembly over the common reception frequency.

2. The system recited in claim 1, wherein each of said units includes a data transmitter, a data receiver, and an energy-information separator for separating the electrical energy for powering the motor from the data signals for providing the multi-directional communication.

3. The system recited in claim 1, wherein the data transmitter of each unit includes means for filtering out all frequencies but said predetermined transmission frequency, and said data receiver of each unit includes means for filtering out all frequencies but said predetermined reception frequency.

4. The system recited in claim 2, wherein said energy-information separator includes means for filtering out all frequencies but a frequency to which said separator is tuned.

5. The system recited in claim 1, wherein one of said units is a server for controlling the order in which information is exchanged between units.

6. The system recited in claim 5, wherein said server includes a data transmitter, a data receiver, and a source for transmitting energy to at least two other units.

7. The system recited in claim 5, wherein information is exchanged between at least two units other than the server.

8. The system recited in claim 6, wherein said source transmits energy in the form of DC current.

9. The system recited in claim 6, wherein said source includes means for filtering out all frequencies but a frequency to which said source is tuned.

10. A system as claimed in claim 1, wherein said at least one other subassembly is a rotating collector.

11. A system as claimed in claim 1, wherein said at least one other subassembly is a valve.

12. A system as claimed in claim 1, wherein said at least one other subassembly is an apparatus allowing connection and disconnection of any drill bit present in the well.

13. A system as claimed in claim 1, wherein said motor subassembly is also allocated an address.

\* \* \* \* \*